(12) United States Patent
Hietala et al.

(10) Patent No.: US 6,597,748 B1
(45) Date of Patent: Jul. 22, 2003

(54) METHOD AND APPARATUS FOR RECEIVING A SIGNAL

(75) Inventors: Alex Hietala, Phoenix, AZ (US); Nadim Khlat, Pierre de Fermat (FR); Patrick Clement, Bussigny (FR)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/980,302

(22) PCT Filed: Jun. 1, 2000

(86) PCT No.: PCT/EP00/05147
§ 371 (c)(1),
(2), (4) Date: Nov. 28, 2001

(87) PCT Pub. No.: WO00/74252
PCT Pub. Date: Dec. 7, 2000

(30) Foreign Application Priority Data

Jun. 1, 1999 (EP) .............................. 99401316

(51) Int. Cl.⁷ .............................................. H04L 27/16
(52) U.S. Cl. .................................................... 375/324
(58) Field of Search ................................ 375/329, 316, 375/323, 324, 326, 327, 339, 373; 455/130, 146, 209, 210, 324, 317, 304, 189.1, 205, 207, 201, 202; 329/306, 304

(56) References Cited

U.S. PATENT DOCUMENTS

| | | | |
|---|---|---|---|
| 4,944,025 A | | 7/1990 | Gehring et al. |
| 5,659,891 A | * | 8/1997 | Hays et al. ............... 455/103 |
| 5,778,022 A | * | 7/1998 | Walley ...................... 375/206 |
| 5,828,705 A | * | 10/1998 | Kroeger et al. ............ 375/326 |
| 5,828,955 A | * | 10/1998 | Lipowski et al. .......... 455/324 |
| 5,850,598 A | * | 12/1998 | Behrent .................... 455/324 |
| 6,035,186 A | * | 3/2000 | Moore et al. .............. 455/313 |
| 6,058,147 A | * | 5/2000 | Eklof et al. ................ 375/344 |
| 6,072,992 A | * | 6/2000 | Mishima et al. ........... 455/76 |
| 6,148,045 A | * | 11/2000 | Taura et al. ............... 375/344 |
| 6,335,952 B1 | * | 1/2002 | Lee et al. ................... 375/327 |
| 6,366,622 B1 | * | 4/2002 | Brown et al. .............. 375/322 |
| 6,418,158 B1 | * | 7/2002 | Vishwanath et al. ....... 375/139 |

FOREIGN PATENT DOCUMENTS

WO    WO 94/29948    12/1994

OTHER PUBLICATIONS

PCT International Search Report, 6 pgs.–.

* cited by examiner

*Primary Examiner*—Emmanuel Bayard
(74) *Attorney, Agent, or Firm*—Robert L. King

(57) ABSTRACT

Apparatus 20, 30, 50, 60 for receiving a carrier signal modulated by a wanted signal, the modulated carrier signal occupying one of a plurality of channels whose central frequencies are separated from one another by a fixed frequency referred to as the channel spacing, the apparatus including a local oscillator 28 for generating first and second signals at a frequency which is not an integral multiple of half the channel spacing whereby when the received carrier signal is mixed with the first and second signals, a complex, digital Very Low Intermediate Frequency (VLIF) signal is generated in which the wanted signal is centred about a VLIF which is slightly larger than half the channel spacing.

15 Claims, 3 Drawing Sheets

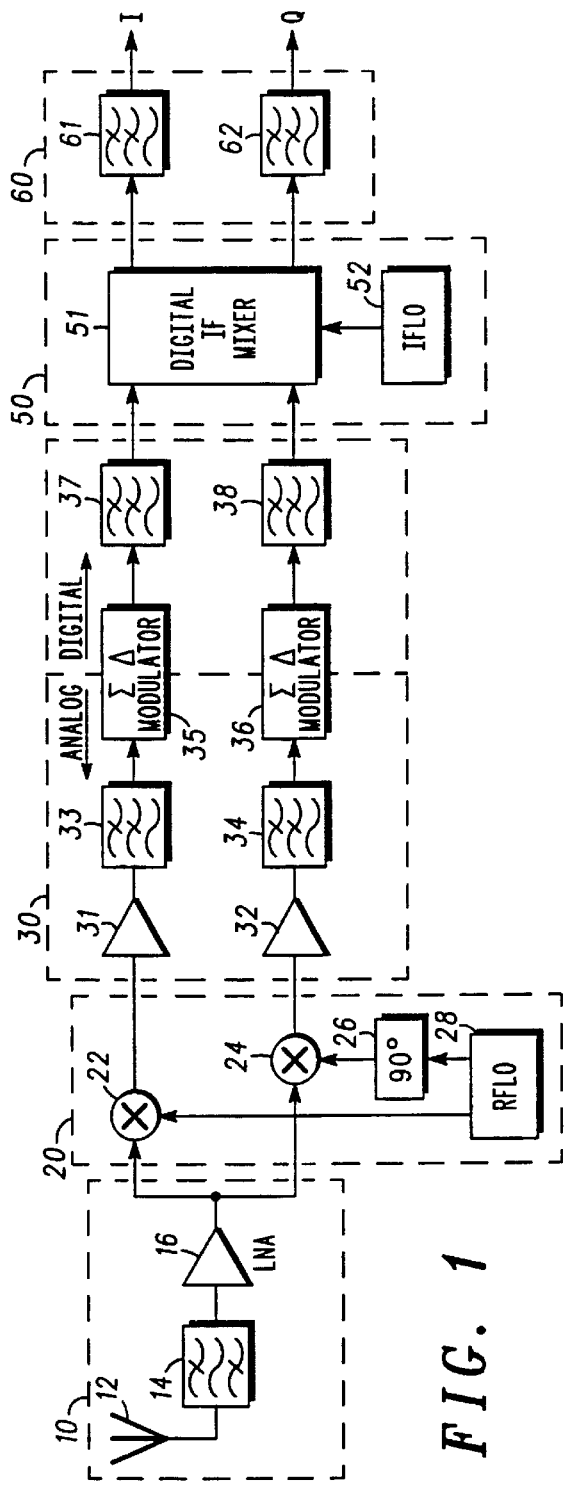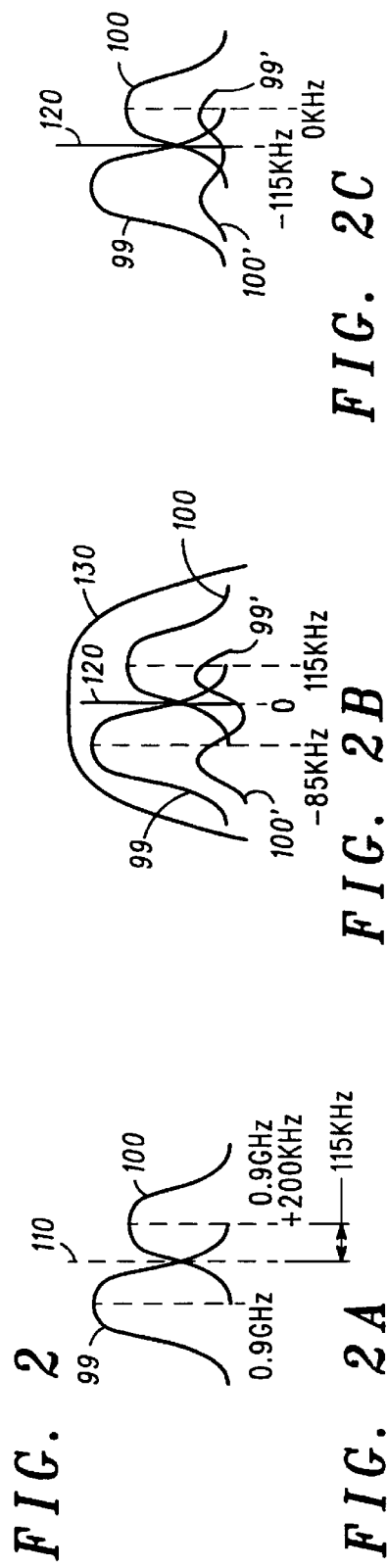
FIG. 1
FIG. 2A
FIG. 2B
FIG. 2C

FIG. 3
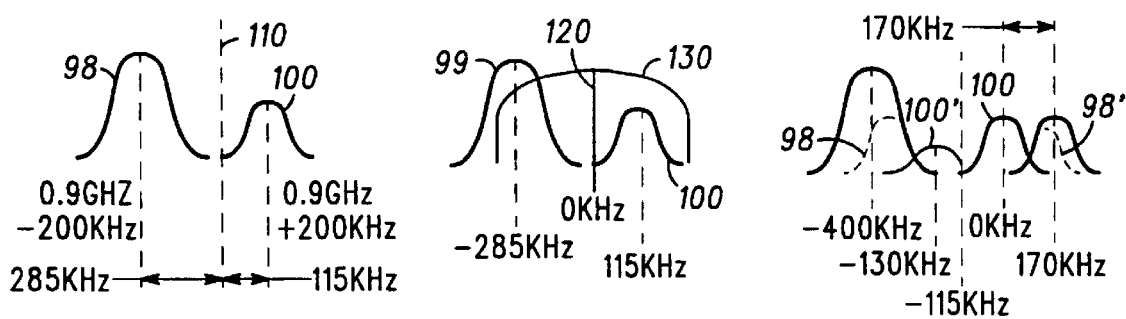
FIG. 3A  FIG. 3B  FIG. 3C
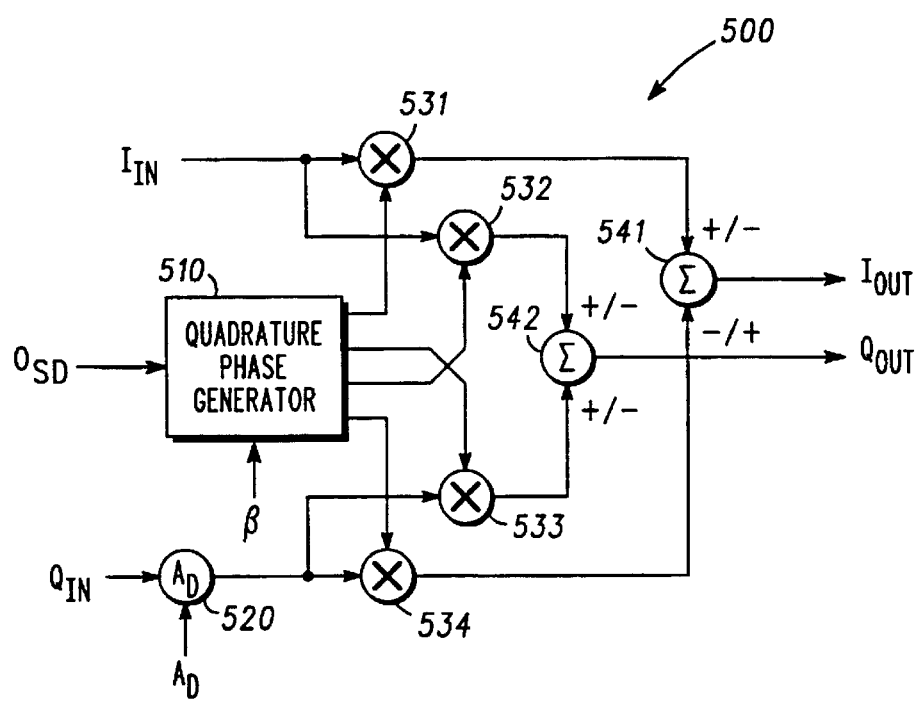
FIG. 4

METHOD AND APPARATUS FOR RECEIVING A SIGNAL

FIELD OF THE INVENTION

The present invention relates to a method and apparatus for receiving a signal, and in particular to a radio receiver, for use in a portable communications device, in which the radio signal to be received is directly down converted to In-phase (I) and Quadrature-phase (Q) signals centred around an Intermediate Frequency (IF) which is of the same order of magnitude as the bandwidth of the signal to be received.

BACKGROUND OF THE INVENTION

Most conventional radio receivers for use in portable communication devices such as cellular telephones, are of the super-heterodyne type in which a radio signal to be received is first down-converted to an intermediate frequency (which is still in the radio-frequency (rf) range) and then further down-converted to a base-band signal (having both I and Q components) from which the information contained in the signal may be recovered. Such a receiver is robust. However, direct conversion receivers and, more recently, very low IF receivers have been proposed in order to reduce costs by eliminating both a relatively high performance, and therefore expensive, Surface Acoustic Wave (SAW) band-pass filter (for allowing the wanted IF signal to pass while blocking all unwanted IF signals in neighbouring channels) and one of the two rf local oscillators required in super-heterodyne receivers.

Direct conversion receivers immediately down convert the received radio signal to a base-band signal thus completely eliminating the IF stage. However, such receivers suffer from the formation of a very large unwanted dc component interfering with the base-band signal. This dc component is formed largely by leakage from the local oscillator being received at the receiver aerial together with the wanted signal, and also by offsets of the amplifiers and mixers in the receivers.

In order to overcome this problem, a very low IF receiver has been proposed in which the received signal is first down-converted to be centred about an IF which is equal to half the channel spacing (i.e. half the bandwidth of the wanted signal), and then it is down-converted again to base-band. In this way, the dc component which is still formed when the first down-conversion takes place, is located (in frequency) at the very edge of the wanted signal. From here, the unwanted dc component should be able to be relatively easily removed by suitable filtering of the dc component, without losing (very much) information contained in the wanted signal because of the dc component's location at the very edge of the wanted signal.

The choice of exactly half of the channel spacing is convenient because a suitable frequency for producing such an IF signal (the suitable frequency being the central frequency of the wanted channel plus or minus the wanted IF signal (i.e. half the channel spacing)) may be generated by an oscillator, operating at half the channel spacing, used in conjunction with a phase locked loop to generate multiples of half of the channel spacing.

SUMMARY OF THE INVENTION

According to a first aspect of the present invention, there is provided apparatus for receiving a carrier signal modulated by a wanted signal, the modulated carrier signal occupying one of a plurality of channels whose central frequencies are separated from one another by a fixed frequency referred to as the channel spacing, the apparatus including a local oscillator for generating first and second signals at a frequency which is not an integral multiple of half the channel spacing whereby when the received carrier signal is mixed with the first and second signals, a complex, digital Very Low Intermediate Frequency (VLIF) signal is generated in which the wanted signal is centred about a VLIF which is slightly larger than half the channel spacing.

Preferably, the VLIF about which the wanted signal is centred is between 10 and 20 percent larger than half the channel spacing. Such a choice of IF is particularly advantageous for complex modulation schemes in which each symbol represents two or more bits, as will be required for the evolving standard known as EDGE (Enhanced Data-rate GSM Evolution), and corresponding standards in the US, as with these modulation schemes, it has been surprisingly discovered by the present inventors that significant information is contained in the edge portions of the signal (i.e. up to plus and minus half the channel spacing from the centre of the signal), the loss of which can give rise to an unacceptably large bit or block error rate. An example of a complex modulation scheme in which significant information is contained at the very edge of the channel is 8QPSK (8-position Quadrature Phase Shift Keying) where each symbol represents 3 bits.

Preferably, the local oscillator is a fractional-N phase locked loop (fracNpll). Preferably, the fracNpll is a multi-accumulator fracNpll.

Preferably, the apparatus further comprises a complex multiplier for down-converting the wanted signal from being centred about a VLIF to a base-band signal while substantially removing any unwanted image signals. Preferably, the complex multiplier includes adjustment means for adjusting either or both of the phase or gain of one of the In-phase and Quadrature-phase signals relative to the other. In relatively simple cases, it may be advantageous to use first-order adjustment means. However, in some cases it may be advantageous to use higher-order adjustment means.

The adjustment means is particularly advantageous in the present invention because it helps to overcome a previously perceived difficulty associated with using a VLIF which is larger than half the channel spacing. The drawback is that as the VLIF is increased, so the band-width of the analogue to digital converter (adc) must be increased, and this in turn increases the amount of the negative alternate channel which is admitted by the adc; it also thus increases the amount of this negative alternate channel which, as an image, appears in the bandwidth of the wanted signal and which must be removed by the complex multiplier. By providing first or even second-order phase and gain adjustment means, it is possible to set the image rejection to zero (i.e. such that the amount of image components appearing in the base-band signal as noise after passing through the complex multiplier is substantially zero) for one (in the case of first order adjustment means) or even two or more (in the case of second or higher order adjustment means) specific frequencies. In this way, judicious setting of the adjustment means can minimise the effects of the negative alternate channel (which in many systems may in fact be much larger than either adjacent channel).

Preferably, the apparatus includes an adc, which preferably takes the form of an over-sampled sigma delta adc, located to receive the complex IF signal and to convert it into a digital signal.

Preferably, the apparatus is formed on an integrated circuit which advantageously includes transmission circuitry for transmitting signals. Ideally, the apparatus and the transmission circuitry share a number of components such as the local oscillator.

BRIEF DESCRIPTION OF THE DRAWINGS

In order that the present invention may be better understood, an embodiment thereof will now be described by way of example only, with reference to the accompanying drawings in which:

FIG. 1 is a block diagram of a radio receiver in accordance with the present invention;

FIGS. 2A–2C are diagrams illustrating the signal processing performed by the radio receiver of FIG. 1 using a wanted GMSK signal and a single negative adjacent channel GMSK signal as an example input to the receiver;

FIGS. 3A–3C are diagrams illustrating the signal processing performed by the radio receiver of FIG. 1 using a wanted GMSK signal and a single negative alternate channel GMSK signal as an example input to the receiver;

FIG. 4 is a block diagram of a first order complex balanced multiplier suitable for use in the receiver of FIG. 1.

DETAILED DESCRIPTION OF THE DRAWINGS

Figure 5:
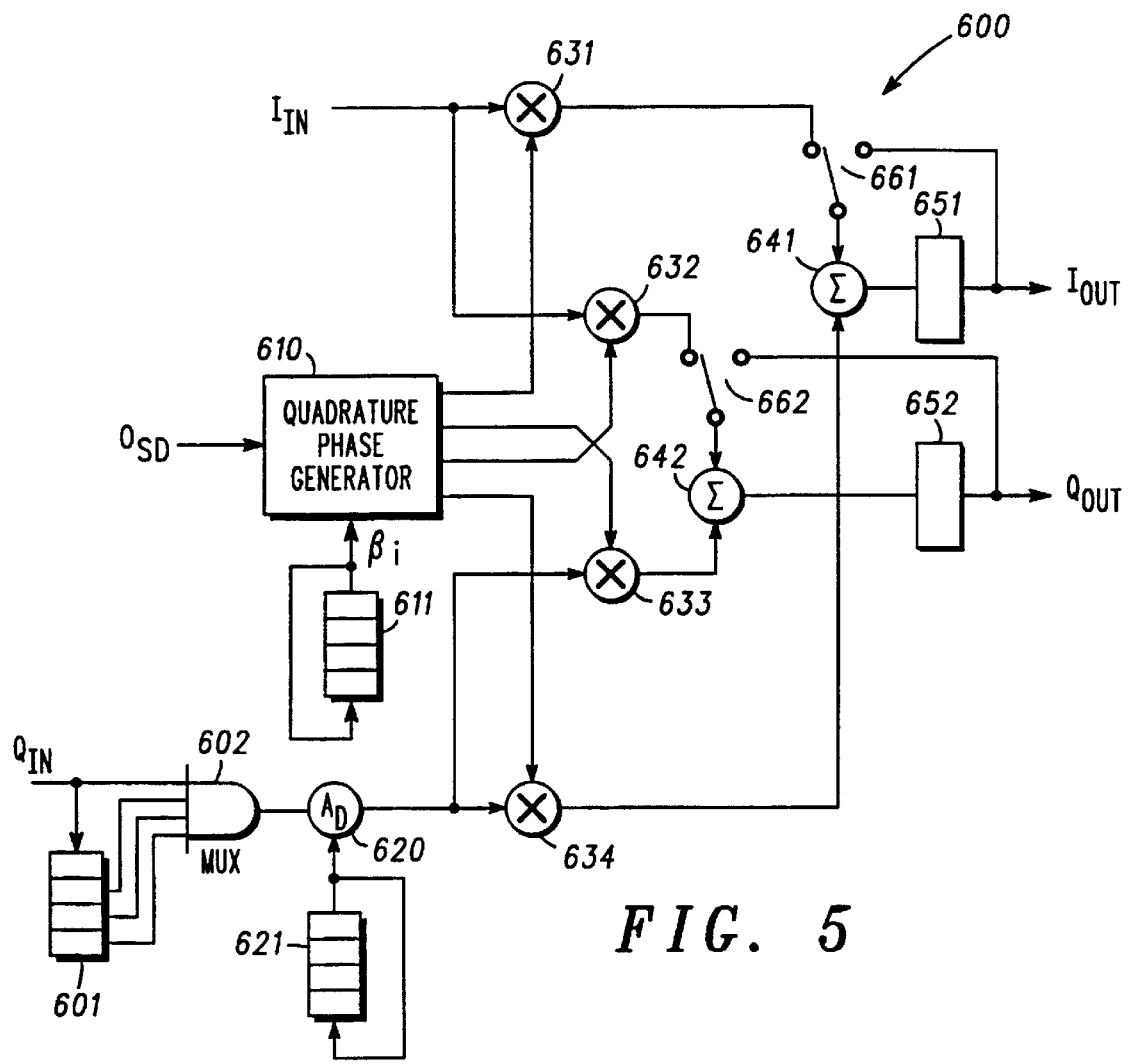
FIG. 5 is a block diagram similar to FIG. 4 showing an alternative complex balanced multiplier suitable for use in the receiver of FIG. 1.

Referring to FIG. 1, there is shown a Digital Very Low Intermediate Frequency (DVLIF) receiver 1 comprising a Radio Frequency (RF) portion 10, a Very Low Intermediate Frequency (VLIF) portion 30, and a base-band portion 60, with an RF mixer stage 20 located between the RF portion 10 and the VLIF portion 30, and a digital VLIF mixer stage 50 located between the VLIF portion 30 and the base-band portion 60. RF portion 10 comprises an aerial 12, an RF band-pass receive filter 14 and an amplifier 16. RF mixer stage 20 comprises an In-phase (I) RF mixer 22, a Quadrature-phase (Q) RF mixer 24, a 90° RF phase shifter 26 and an RF Local Oscillator (LO) 28. VLIF portion 30 comprises I and Q IF amplifiers 31,32, I and Q low-pass anti-aliasing filters 33,34 I and Q sigma-delta modulators 35,36, and I and Q digital low pass filters 37,38. Digital VLIF mixer stage 50 comprises a complex balanced multiplier 51 operating as a digital IF mixer, and an IF LO 52. Base-band portion 60 is shown only comprising low pass I and Q digital selectivity filters 61 and 62, though it will of course further comprise the digital processing elements for decoding the digital signals, etc. as will be understood by a person skilled in the art.

The basic operation of the receiver of FIG. 1 will now be described. The aerial 12 essentially captures all radio signals which impinge on it and these are fed to the receive filter 14 which attempts to filter away all signals which are outside the frequency range of interest. For example, if the receiver is intended for use as a GSM receiver, the receive filter 14 will greatly reduce the magnitude of all radio signals received by the aerial which are not within the GSM frequency range of 900 MHz plus or minus 10% or so. The output from receive filter 14 is then amplified by amplifier 16 before being input to the RF mixing stage 20.

At the RF mixing stage 20, the signals output from the amplifier 16 are down-converted to a VLIF. RF LO 28 generates an RF signal whose frequency is such that the difference between it and the central frequency of the channel which the receiver is trying to receive is equal to the predetermined desired VLIF. The purpose of the 90° phase shifter 26 is to enable I and Q components of the down-converted signals to be output from the I and Q RF mixers 22,24. By generating I and Q components of the signal output by the amplifier 16, it becomes possible to consider the signal as a complex signal having real and imaginary components (corresponding to its I and Q components) and in this way it is possible to distinguish between signals having negative and positive frequencies respectively.

The I and Q signals output by the I and Q RF mixers 22,24 respectively are input to I and Q amplifiers 31,32 and I and Q low pass anti-aliasing filters 33,34 respectively. The purpose of these components is to remove all frequency components of signals arriving at the aerial 12 which are too high (when down-converted) to belong to the signal of interest (which when down-converted will lie approximately between dc and the channel spacing). In practice, because the filters 33,34 are simple (i.e. non-complex), they will also pass the signal contained in the negative adjacent channel (this is the channel located adjacent to the wanted channel substantially on the other side of the frequency of the RF signal generated by the RF LO 28). Furthermore, because real (i.e. non-ideal) filters do not have infinitely sharp cut-off points, the filters 33,34 (to avoid distorting the wanted signal) will also allow a substantial part of both the positive adjacent channel (the channel located adjacent to the wanted channel on the same side of the frequency of the RF signal generated by the RF LO 28 as the wanted channel) and the negative alternate channel (the channel located next but one to the wanted channel on the other side of the frequency generated by the RF LO 28, i.e. the channel adjacent to the negative adjacent channel referred to above).

The signals output from the filters 33,34 are then input to the I and Q sigma-delta modulators 35,36. The sigma-delta modulators 35,36, as will be well understood by a person skilled in the art, generate digital signals which correspond to the input analogue signals plus a large amount of high frequency noise. The digital signals output by the sigma-delta modulators 35,36 are therefore passed through digital low pass filters 37,38 whose purpose is to remove most of the high frequency noise generated by the sigma-delta modulators 35,36 so as to be left with a digital representation of the analog signals passed by the anti-aliasing low-pass filters 33,34 (i.e. the wanted channel, the negative adjacent channel and parts of the positive adjacent channel and the negative alternate channel).

These signals are then input to the digital VLIF mixer stage 50. The primary function of this stage is to further down-convert the wanted signal to base-band (i.e. centred about d.c. frequency). However, in the present invention, it also performs the function of IQ balancing. IQ balancing means compensating the signals for variations in amplitude and phase between the I and Q components of the signals travelling, through the analogue sections of the RF mixing stage 20 and the VLIF portion 30 which are introduced because of differences in the analogue components (or, more precisely, in the responses of the analogue components to the signals passing through them) in the I (22,31,33,35) and Q (24,32,34,36) paths respectively. If these imbalances are not compensated, it results in unwanted image components of signals other than the wanted signal appearing as noise in the same base-band channel as the wanted signal. The way in which this occurs is discussed in greater detail below. Note that the digital VLIF mixer stage 50 is shown as comprising a complex balanced multiplier 51 and an IF LO 52. The complete VLIF mixer stage 50 includes elements for providing the IQ balancing and these may be considered as separate from the complex balanced multiplier or the IF LO or they may be considered as forming a part of one or other or both of these depending on the exact configuration. This will be discussed in greater detail below with reference to FIGS. 4 and 5.

The signals output from the digital VLIF mixer stage 50 are input to the I and Q digital low-pass selectivity filters 61,62 whose purpose is to remove all noise components outside the channel containing the wanted signal. The output from these filters will then typically be fed to a digital signal processor adapted to perform digital signal processing on the I and Q signals output by filters 61,62, such as equalisation, voice decoding etc.

Referring to FIG. 2, an example of the signal response of the receiver of FIG. 1 will now be described. The first frequency spectrum diagram (FIG. 2A) of FIG. 2 shows a wanted signal 100 and a negative adjacent signal 99 centred at 900.2 MHz and 900.0 MHz respectively, together with a dotted line representing the single tone signal 110 generated by RF LO 28. These signals represent typical GSM signals, thus each signal 99,100 has a GMSK spectrum and the channel spacing is 200 KHz. According to the present invention, the frequency of the RF LO signal 110 is chosen such that the wanted signal when down-converted will be centred about a VLIF which is slightly greater than half the channel spacing, and preferably between 1.1–1.2 times half the channel spacing. Thus in FIG. 2, the RF LO signal 110 is shown as being at a frequency of 900.085 MHz. This choice of frequency for the RF LO signal 110 results in the wanted signal 100 being centred about a VLIF of 115 KHz when down-converted by the RF mixer stage 50. A particularly preferred choice of the RF LO according to the present invention would be such as to give rise to the wanted signal being centred about a VLIF of 115.051 KHz which corresponds to 13 MHz/24*435/2048 as this frequency can be generated by a Multiple ACCumulator FRACtional-N Phase Locked Loop (MACC FRAC-N PLL) frequency synthesiser. Such a frequency synthesiser is known in the art and is described in, for example, U.S. Pat. No. 5,111,162 ["Digital Frequency Synthesizer having AFC and Modulation Applied to Frequency Divider," Hietala et al.].

The second frequency spectrum diagram (FIG. 2B) of FIG. 2 shows the signals 100,99 after having been down converted to a VLIF such that the wanted signal 100 is centred about a VLIF of 115 KHz. The negative adjacent signal is also down converted to a VLIF centred about 5 KHz (note that we are considering the signals as complex signals here which is why it is possible to distinguish between a negative and a positive frequency). Also shown in FIG. 2B is a substantially d.c. signal 120 which is referred to as the IM2 (second order intermodulation) signal. The IM2 signal is noise which is generated by a combination of leakage from the RF LO being detected by the aerial 12 and re-combining in essence with itself at the RF mixer stage 20, and second order non-linearities in the analogue mixers 22,24. The effect of filters 33,34 is also shown in FIG. 2B by the filter response curve 130. Because filters 33,34 are real filters, their frequency response is symmetrical about d.c. In order to avoid clipping or distorting the wanted signal 100, the corner frequency of the filters is set beyond 215 KHz. This results in substantially all of the negative adjacent channel 99 (which does not extend much beyond –185 KHz) being passed by these filters 33,34.

FIG. 2B also shows some image signals 99',100' which can be referred to as the negative adjacent signal image 99' and the wanted signal image 100'. The negative adjacent signal image 99' is centred around +85 KHz while the wanted signal image 100' is centred around –115 KHz. These image signals result from imbalances between the I and Q paths, which result, in turn, from imbalances in the analogue components (most precisely in the frequency responses of such components) contained in the different I and Q paths.

The final frequency spectrum diagram (FIG. 2C) of FIG. 2 shows the wanted 100, negative adjacent 99 and IM2 120, and image 99',100' signals having been further down-converted by the digital VLIF mixer stage 50 such that the wanted signal 100 is now at base-band (i.e. centred about d.c.) and is in a digital format. The negative adjacent signal has been further down-converted and is centred at –200 KHz, while the IM2 signal is located at –115 KHz. The fact that the IM2 signal is located 115 KHz away from the centre of the wanted signal is a critical advantage of the receiver according to the present invention as it permits this signal to be filtered out by either a low pass filter or a notch filter without clipping or distorting the wanted signal 100. FIG. 2C also shows the image signals 99',100' which have also be down-converted by –115 KHz such that the negative adjacent signal image 99' is now centred about –30 KHz and the wanted signal image 100' is now centred about –230 KHz. The image signals are also shown as having been reduced in magnitude from FIG. 2B, as a result of the I,Q balancing of the VLIF mixer stage 50. This I,Q balancing is the second function of the VLIF mixer stage 50. In practice, the I,Q balancing of the VLIF mixer stage 50 can only be performed substantially perfectly at a particular frequency (or at a few distinct frequencies), however, for the sake of clarity and in order to better see where the optimum frequency or frequencies would be, this notchiness effect of the VLIF mixer stage is not shown in FIGS. 2c and 3C. Clearly, the wanted signal image 100' is well separated from the wanted signal 100 (which does not extend substantially beyond ±100 KHz), and thus it would not be worthwhile maximising the balancing of the VLIF mixer stage at this frequency, however the negative adjacent channel image 99' is centred about –30 KHz and will appear in the wanted signal as noise, and thus it might be worthwhile maximising the balancing of the VLIF mixer stage at the central frequency of the negative adjacent signal image 99'.

Referring now to FIG. 3, a second example of the signal response of the receiver of FIG. 1 will now be described; in which wanted signal 100 and a negative alternate signal 98 centred at 900.2 MHz and 899.8 MHz respectively, are shown arriving at aerial 12 (together with a dotted line representing the single tone signal 110 generated by RF LO 28) in place of the wanted 100 and negative adjacent 99 signals. Of course, when operating in a real environment, the wanted signal 100 will be received together with a large number of other signals including both a negative adjacent and a negative alternate signal; however, for the sake of clarity, FIGS. 2 and 3 consider only one signal, in addition to the wanted signal, at a time.

The negative alternate signal 98 is spaced from the wanted signal 100 by 400 KHz. The negative alternate signal 98 is shown as being much larger than the wanted signal 100 because, according to the GSM Specifications, an alternate channel can contain signals whose total power is up to 41 dB greater than that of the wanted signal 100 as a result of re-use provisions of the cellular structure of a GSM network.

From the second frequency spectrum diagram (FIG. 3B) of FIG. 3, it can be seen that although a large part of the down-converted negative alternate signal 98 will be filtered by the filters 33,34 (whose frequency response is again shown in FIG. 3 by the filter response, curve 130), the signal power of the remainder of the negative alternate signal 98 which is still passed by the filters 33,34 is none-the-less significantly large. The main reason for this is simply that the negative alternate signal is just so much bigger than the wanted signal that even after its power is reduced by the action of the filters it will still be significantly large. Furthermore, since these signals are all Gaussian in terms of their signal strength frequency distribution, and since the negative alternate signal is just so large, its components outside its allotted channel (i.e. spreading into the negative adjacent channel) will also represent a significant level of noise which must be taken into account when designing a receiver.

From the third frequency spectrum diagram (FIG. 3C) of FIG. 3, it can be seen that for a reasonable amount of imbalance between the I and Q paths of the receiver, and without any balancing being performed by the complex balanced multiplier 51, a relatively large portion of the negative alternate signal image 98' appears in the wanted channel after conversion to base-band (note that image signals 98',100' should really have been included in FIG. 3B but have been omitted for the sake of clarity). By comparing FIG. 3C with FIG. 2C, it is apparent that the negative alternate image 98' will potentially present a greater amount of unwanted noise within the wanted channel than the negative adjacent signal image 99' will. Furthermore, it is apparent that the two images peak at different frequencies (Again, the effect of the balancing of the VLIF mixer stage being effective at only one or a few distinct frequencies is not shown in FIG. 3C). Thus, the complex balanced multiplier should preferably be able to perform IQ balancing in such a way as to minimise the effect of at least the negative alternate signal image and ideally both the negative alternate and the negative adjacent signal images.

FIG. 4 shows a first order complex balanced multiplier 500. The complex balanced multiplier 500 comprises a quadrature phase generator 510; a Q-path gain adjustment means 520; first, second, third and fourth multipliers 531, 532,533,534; and first and second adder/subtractors 541, 542. Quadrature phase generator 510 receives a phase signal Osd from the IF LO 52 and a programmable Q-path phase correction β as inputs, and outputs cos(Osd), sin(Osd), cos(Osd+β) and sin(Osd+β) signals, which are applied to the second inputs of the first, second, third and fourth multipliers 531,532,533,534 respectively; additionally, the first and second multipliers 531,532 have the digital I-path signal Iin (output from the digital I filter 37 of FIG. 1) applied to their first inputs; while the third and fourth multipliers 533,534 have the digital Q-path signal Qin (output from the digital Q filter 38 of FIG. 1) applied to their first inputs. The outputs of the first and fourth multipliers 531,534 are applied as inputs to the first adder/subtractor 541 which outputs a digital baseband I signal Iout; while the outputs of the second and third multipliers 532,533 are applied as inputs to the second adder/subtractor 542 which outputs a digital baseband Q signal Qout.

The effect of the complex balanced multiplier 500 is to generate output I and Q signals Iout and Qout from input signals Iin, Qin and Osd, as set out in equation 1 below:

$$I_{out}+jQ_{out}=(I_{in}+jA_d \cdot e^{j\beta} \cdot Q_{in}) \cdot e^{j O_{ad}} \qquad \text{Equation 1}$$

From Equation 1, it can be seen that if Qin differs from what it is supposed to be because of relative imbalances between the I and Q paths by 1/Ad in gain and −β in phase, then the effect of the complex balanced multiplier 500 is to correct the imbalance as desired. Unfortunately, the imbalance between the paths will not be constant over frequency. Thus the complex balanced multiplier 500 of FIG. 1 is only able to exactly balance the I and Q paths at a single frequency. In order to fully describe the imbalance between the paths created by the differences in the analogue components contained in these paths, one must consider the imbalances as being caused by a filter having a Finite Impulse Response (FIR) given by Equation 2 below:

$$H_{imbalance}(z) = \frac{1}{A_{d0}} \cdot e^{-j\beta_0} + \frac{1}{A_{d1}} \cdot e^{-j\beta_1} \cdot z^{-1} + \frac{1}{A_{d2}} \cdot e^{-j\beta_2} \cdot z^{-2} + \cdots \qquad \text{Equation 2}$$

Clearly, to counter the effect of such an FIR one needs to provide a filter or equivalent means having the response given by Equation 3 below:

$$H_{balance}(z)=A_{d0} \cdot e^{+j\beta_0}+A_{d1} \cdot e^{+j\beta_1} \cdot z^{-1}+A_{d2} \cdot e^{-j\beta_2} \cdot z^{-2}+ \qquad \text{Equation 3}$$

From equation 3, it is apparent that the first-order compensation provided by complex balanced multiplier 500 corresponds to the first term of $H_{balance}$. In order to provide higher-order compensation or balancing, one could provide a dedicated digital filter having an FIR to compensate for the imbalance up to as many orders as desired. However, it is preferable to re-use some of the elements of the complex multiplier contained within the digital VLIF mixer stage 50.

FIG. 5 illustrates a complex balanced multiplier 600 in which some parts are re-used to enable a higher-than-first-order FIR to be performed which can compensate for the imbalance between the I and Q paths at more than one frequency (note that generally speaking, a second order FIR will be able to compensate the imbalance at 2 specific frequencies exactly, while a third order FIR can compensate at 3 specific frequencies, etc.). Specifically, FIG. 5 illustrates a fourth order complex balanced multiplier, however, it will be readily apparent to the reader that the arrangement may be modified to alter the order of the FIR of the arrangement, the major constraint being the clock speed available to the re-used elements compared to the sample frequency of the input I and Q signals.

Complex balanced multiplier 600 comprises a $Q_{in}$ storage register 601 and an associated multiplex means 602; a quadrature phase generator 610 and a phase correction $\beta_i$ storage register 611; a Q-path gain adjustment means 620 and a gain adjustment $A_{Di}$ storage register 621; first, second, third and fourth multipliers 631,632,633,634; first and second adder/subtractors 641,642; $I_{out}$ and $Q_{out}$ storage registers 651,652; and first and second switches 661,662.

The operation of complex balanced multiplier 600 is as follows. The I and Q signals input to the complex balanced multiplier 600 are in the form of digital sampled values. If one considers the sampled values $I_{in0}$, $Q_{in0}$, $Q_{in-1}$, $Q_{in-2}$, $Q_{in-3}$ where $I_{in0}$ and $Q_{in0}$ are the values of $I_{in}$ and $Q_{in}$ at time t=0, $Q_{in-1}$ is the preceding sampled value of $Q_{in}$ at time t=$-\tau_s$, $Q_{in-2}$ is the value of $Q_{in}$ at time t=$-2\tau_s$, etc., where $\tau_s$ is the inverse of the sampling frequency $f_s$. $Q_{in}$ storage 601 stores the 3 preceding sample values of $Q_{in}$, namely $Q_{in-1}$, $Q_{in-2}$, $Q_{in-3}$. The associated multiplex means 602 has 4 inputs (namely $Q_{in0}$, $Q_{in-1}$, $Q_{in-2}$, $Q_{in-3}$) any one of which it can choose to form the output which is passed on to the gain adjustment means 620. Gain adjustment means 620 multiplies together the 2 values appearing at its two inputs, namely the output from multiplex means 602 and the output from the gain adjustment $A_{Di}$ storage register 621 which stores gain adjustment coefficients $A_{D0}$, $A_{D1}$, $A_{D2}$, $A_{D3}$.

Quadrature phase generator 610 receives as inputs signals Osd and the output from the phase correction $\Theta_i$ storage register 611. The signals output by the quadrature phase generator 610 are cos(Osd) and sin(Osd) which are output at a rate of $f_s$ and cos(Osd+$\beta_i$) and sin(Osd+$\beta_i$) which are output at a rate of $4f_s$. The signals cos(Osd), sin(Osd), cos(Osd+$\beta$) and sin(Osd+$\beta$) are applied to the second inputs of the first, second, third and fourth multipliers 631,632, 633,634 respectively; additionally, the first and second multipliers 631,632 have the digital I-path signal $I_{in0}$ (output from the digital I filter 37 of FIG. 1) applied to their first inputs; while the third and fourth multipliers 633,634 have the output of the gain adjustment means 620 applied to their first inputs. The output of the first multiplier 631 is applied to a first terminal of the first switch 661; the output of the second multiplier 632 is applied to a first terminal of the second switch 662; the output of the third multiplier 633 is applied as an input to the second adder/subtractor 642; and the output of the fourth multiplier 634 is applied as an input to the first adder/subtractor 641. The output of the first adder/subtractor 641 is applied to the $I_{out}$ storage register 651 and the output of the second adder/subtractor 642 is applied to the $Q_{out}$ storage register 652. The output of the $I_{out}$ storage register 651 forms the $I_{out}$ output of the complex balanced multiplier 600 and is additionally fed-back to a second terminal of the first switch 661. The output of the $Q_{out}$ storage register 652 forms the $Q_{out}$ output of the complex balanced multiplier 600 and is additionally fed-back to a second terminal of the second switch 662. First switch 661 acts to connect either its first terminal or its second terminal to an input to the first adder/subtractor 641. Second switch 662 acts to connect either its first terminal or its second terminal to an input of the second adder/subtractor. It will be apparent to the reader that when either switch 661,662 is connecting the input to the respective adder/subtractor to the second terminal of the switch, that the adder/subtractor together with the respective storage register will act as an accumulator with the running total being stored in the respective storage register.

Consider now that the desired outputs from the complex balanced multiplier 600 are given by equation 4 below:

$$I_{out}+jQ_{out}=(I_{in0}+jQ_{in0} \cdot A_{D0} \cdot e^{j\beta 0}+jQ_{in-1} \cdot A_{D1} \cdot e^{j\beta 1}+ \ldots +jQ_{in-3} \cdot A_{D3} \cdot e^{j\beta 3})e^{jOsd}$$ (Equation 4)

In order to achieve the $I_{out}$ and $Q_{out}$ signals given by this equation, the complex balanced multiplier operates four cycles in every sampling period $\tau_s$. In the first cycle, the terms $I_{in0}*e^{jOsd}$ and $jQ_{in0}*A_{D0}*e^{j\beta 0}*e^{jOsd}$ are calculated. To do this, multilplex means 602 selects its first input which receives $Q_{in0}$ as its output and gain adjustment storage register 621 outputs gain adjustment constant $A_{D0}$ which is then multiplied with $Q_{in0}$ at the gain adjustment means 620 to generate $Q_{in0}*A_{D0}$. Also phase adjustment storage register 611 outputs $\beta_0$ which is used by the quadrature phase generator 610 to generate the real (cos) and imaginary (sin) components of $e^{jOsd}$ and $e^{j(\beta 0+Osd)}$ respectively.

These components are appropriately multiplied with $I_{in0}$ and $Q_{in0}$ in multipliers 631 to 634 and the real and imaginary terms are appropriately added together in adder/subtractors 641 and 642 to produce the real and imaginary parts of $(I^{in0}+jQ_{in0}*A_{D0}*e^{j62~0})*e^{jOsd}$ respectively. These are then stored in the $I_{out}$ and $Q_{out}$ storage registers 651,652 respectively and the first cycle comes to an end.

During the second cycle, first and second switches 661, 662 are switched into their second state such that the output of the storage registers 651,652 are fed back to the first inputs of the adder/subtractors 641,642. Also, multiplex means 602 selects its second input which receives $Q_{in-1}$ from $Q_{in}$ storage register 601 as its output; gain adjustment storage register 621 outputs $A_{D1}$ to gain adjustment means 620; and phase adjustment means 611 outputs $\beta_1$ to the quadrature phase generator 610 which generates real and imaginary components of $e^{j(\beta 1+Osd)}$ which are multiplied with the output of gain adjustment means 620 (i.e. $Q_{in-1}*A_{D1}$) in multipliers 633 and 634 to generate imaginary and real components of the term $jQ_{in-1}*A_{D1}*e^{j(\beta 1+Osd)}$ which are accumulated to the values stored in storage registers 652 and 651 respectively; the new totals are then restored in registers 652 and 651 ready for the third and fourth cycles.

The third and fourth cycles proceed in an analogous way to the second cycle until all of the components required by Equation 4 have been calculated whereupon signals $I_{out}$ and $Q_{out}$ become valid; switches 661 and 662 are returned to their first positions; and new sample values of $I_{in}$, $Q_{in}$ and Osd are received at the inputs to the complex balanced multiplier 600.

It will by now be apparent to the reader that the present invention provides a radio receiver architecture which has all of the advantages of a direct conversion receiver in terms of the lack of an expensive SAW filter and the need for a second rf local oscillator, and which is none-the-less able to receive narrow-band (e.g. 200 KHz) radio-signals having greater than first order modulation (i.e. 2 or more bits per symbol) transmitting symbols at rates of the order of 20–30 thousand symbols per second (in which the adjacent and alternate channels may contain noise having a significantly greater magnitude than the magnitude of the wanted signal, in accordance with GSM specifications or similar). This is achieved by means of a local oscillator which down-converts the wanted signal to a VLIF centred about a frequency which is between 1.1 and 1.2 times half the channel spacing. In order to overcome the additional amount of noise placed into the wanted signal channel at base-band from the negative alternate image channel as a result of this choice of channel spacing, a balanced complex multiplier is used to perform the IF to base-band down-conversion which provides enhanced image rejection, Optimally, a second or higher order balanced complex multiplier is used which permits substantially perfect image rejection at two or more frequencies which may be pre-programmed to minimise the effects of noise from unwanted image signals.

The complex balanced multipliers of FIGS. 4 and 5 are examples of possible implementations only and alternative implementations will be readily apparent to persons skilled in the art.

What is claimed is:

1. Apparatus for receiving a signal that is in conformity with a communications standard and comprises a carrier signal modulated by a wanted signal, said communications standard defining a plurality of communications channels having central frequencies that are separated from one another by a fixed frequency referred to as a channel spacing, the modulated carrier signal occupying one of said plurality of communications channels, the apparatus including a local oscillator for generating first and second signals at an actual local oscillator frequency which differs from said central frequency of the channel occupied by said wanted signal by a frequency difference whose magnitude is greater than half the channel spacing whereby when the received carrier signal is mixed with the first and second signals, a complex, digital Very Low Intermediate Frequency (VLIF) signal, modulated by the wanted signal, is centered about a very low intermediate frequency whose magnitude is larger than half the channel spacing.

2. Apparatus as claimed in claim 1 wherein the magnitude of the very low intermediate frequency is substantially between 10 and 20 percent larger than half the channel spacing.

3. Apparatus as claimed in claim 1 wherein the local oscillator is a fractional-N phase locked loop frequency synthesiser.

4. Apparatus as claimed in claim 3 wherein the fractional-N phase locked loop frequency synthesiser incorporates two or more accumulators.

5. Apparatus as claimed in claim 1 further comprising a complex multiplier for down-converting the wanted signal from being centered about the very low intermediate frequency to a baseband signal while substantially removing any unwanted image signals.

6. Apparatus as claimed in claim 5 wherein the complex multiplier includes adjustment means for adjusting either or both of the phase or gain of one of an In-phase and a Quadrature-phase signal relative to the other.

7. Apparatus as claimed in claim 6 wherein the adjustment means is first-order adjustment means.

8. Apparatus as claimed in claim 6 wherein the adjustment means is second-or-higher-order adjustment means.

9. Apparatus as claimed in claim 1 further including an adc located to receive the complex IF signal and to convert it into a digital signal.

10. Apparatus as claimed in claim 9 wherein the adc is an over-sampled sigma-delta adc.

11. Apparatus as claimed in claim 1 wherein the apparatus is formed as an integrated circuit.

12. Apparatus as claimed in claim 1 wherein the magnitude of said frequency difference of said actual local oscillator frequency from said central frequency of said wanted signal is between 10 and 20 percent larger than half the channel spacing.

13. A method of receiving a signal that is in conformity with a communications standard and comprises a carrier signal modulated by a wanted signal, said communications standard defining a plurality of communications channels having central frequencies that are separated from one another by a fixed frequency referred to as the channel spacing, said modulated carrier signal occupying one of said plurality of communications channels, the method including generating first and second signals at an actual local oscillator frequency which differs from said central frequency of the channel occupied by said wanted signal by a frequency difference whose magnitude is greater than half said channel spacing, and mixing the received carrier signal with said first and second signals so as to generate a complex, digital Very Low Intermediate Frequency (VLIF) signal modulated by the wanted signal and centered about a very low intermediate frequency whose magnitude is larger than half said channel spacing.

14. A method as claimed in claim 13 wherein the magnitude of said very low intermediate frequency about which the wanted signal is centered is between 10 and 20 percent larger than half said channel spacing.

15. A method as claimed in claim 13 wherein the magnitude of said frequency difference of said actual local oscillator frequency from said central frequency of said wanted signal is between 10 and 20 percent larger than half said channel spacing.

\* \* \* \* \*